United States Patent
Motoyoshi

(10) Patent No.: US 6,683,929 B1
(45) Date of Patent: Jan. 27, 2004

(54) MOBILE COMMUNICATION DEVICE HAVING A GOOD TRACKING PRECISION AND A WIDE FOLLOWING RANGE OF SYNCHRONIZATION

(75) Inventor: Gen Motoyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/391,456

(22) Filed: Sep. 8, 1999

(30) Foreign Application Priority Data

Sep. 8, 1998 (JP) .......................................... 10-253838

(51) Int. Cl.[7] ................................................ H03D 3/24
(52) U.S. Cl. ........................ 375/376; 375/142; 375/150; 375/373; 327/156; 327/163
(58) Field of Search ................................. 375/130, 140, 375/141, 142, 143, 149, 150, 151, 152, 293, 294, 327, 354, 373, 374, 375, 376; 327/141, 147, 149, 152, 153, 156, 158, 161–163, 269–271, 276; 331/1 A, 1 R, 18, 25; 370/503, 515, 516, 517, 518, 342, 350

(56) References Cited

U.S. PATENT DOCUMENTS

| | | | |
|---|---|---|---|
| 5,029,181 A | | 7/1991 | Endo et al. |
| 5,638,362 A | * | 6/1997 | Dohi et al. .................. 370/342 |
| 5,737,362 A | | 4/1998 | Hyun et al. |
| 5,832,021 A | | 11/1998 | Kondo ........................ 375/150 |
| 5,953,367 A | * | 9/1999 | Zhodzicshsky et al. ...... 375/147 |
| 6,198,765 B1 | * | 3/2001 | Cahn et al. .................. 375/142 |
| 6,201,828 B1 | * | 3/2001 | El-Tarhuni et al. ......... 375/150 |
| 6,345,068 B1 | * | 2/2002 | Molev-Shteiman ......... 375/149 |

FOREIGN PATENT DOCUMENTS

| | | |
|---|---|---|
| JP | 6-97907 | 4/1994 |
| JP | 5-344092 | 12/1994 |
| JP | 9-321658 | 12/1997 |

\* cited by examiner

Primary Examiner—Chieh M. Fan
(74) Attorney, Agent, or Firm—Foley & Lardner

(57) ABSTRACT

A mobile communication device has a delay locked loop circuit for carrying out a tracking synchronization of a reception signal. The reception signal may be a spread spectrum signal. The delay locked loop circuit comprises a generating section for generating an early signal and first and second late signals which are different in phase from one another. A multiplying section is for multiplying the reception signal by each of the early signal and the first and the second late signals to produce first through third multiplied signals. A producing section produces an tracking error signal in accordance with the first through the third multiplied signals. A supplying section supplies a clock signal to the generating section on the basis of the tracking error signal to make the generating section generate the early signal and the first and the second late signals.

4 Claims, 3 Drawing Sheets

MOBILE COMMUNICATION DEVICE HAVING A GOOD TRACKING PRECISION AND A WIDE FOLLOWING RANGE OF SYNCHRONIZATION

BACKGROUND OF THE INVENTION

This invention relates to a mobile communication device for use in a spread spectrum communication of code division multiple access (CDMA) system.

In general, it is necessary to reduce a tracking error between a reception signal and a reference signal in a mobile communication device of CDMA system. The mobile communication device comprises a synchronous tracking circuit for carrying out a synchronous tracking between the reception signal and the reference signal. A delay locked loop circuit may be used as the synchronous tracking circuit. A conventional delay locked loop circuit comprises a first generating section for generating an early signal and a first late signal and will be referred as a first conventional delay locked loop circuit. The phase of the first late signal is later in one chip delay than that of the early signal. The first conventional delay locked loop circuit reduces the tracking error between the reception signal and the reference signal in accordance with the early signal and the first late signal, as will be described later.

Furthermore, a conventional delay locked loop circuit comprises a second generating section for generating the early signal and a second late signal and will be referred as a second conventional delay locked loop circuit. The phase of the second late signal is later in two chip delays than that of the early signal. The second conventional delay locked loop circuit reduces the tracking error between the reception signal and the reference signal in accordance with the early signal and the second late signal.

In the first conventional delay locked loop circuit, a following range of synchronization is narrow although the tracking error is small. It is difficult to make the following range of synchronization be wide in the first conventional delay locked loop circuit. As a result, a pull-out often occurs in the first conventional delay locked loop circuit.

In the second conventional delay locked loop circuit, the tracking error is large although the following range of synchronization is wide. It is difficult to make the tracking error be small in the second conventional delay locked loop circuit. As a result, it is difficult to correctly carry out a tracking precision.

SUMMARY OF THE INVENTION

It is an object of this invention to provide a mobile communication device having a good tracking precision and a wide following range of synchronization.

Other objects of this invention will become clear as the description proceeds.

On describing the gist of this invention, it is possible to understand that the present invention is a mobile communication device having a delay locked loop circuit for carrying out a tracking synchronization of a reception signal. The reception signal may be a spread spectrum signal.

According to this invention, the delay locked loop circuit comprises generating means for generating an early signal and first and second late signals which are different in phase from one another, multiplying means for multiplying the reception signal by each of the early signal and the first and the second late signals to produce first through third multiplied signals, producing means for producing a tracking error signal in accordance with the first through the third multiplied signals, and supplying means for supplying a clock signal to the generating means on the basis of the tracking error signal to make the generating means generate the early signal and the first and the second late signals.

DESCRIPTION OF THE PREFERRED EMBODIMENT

Figure 1:
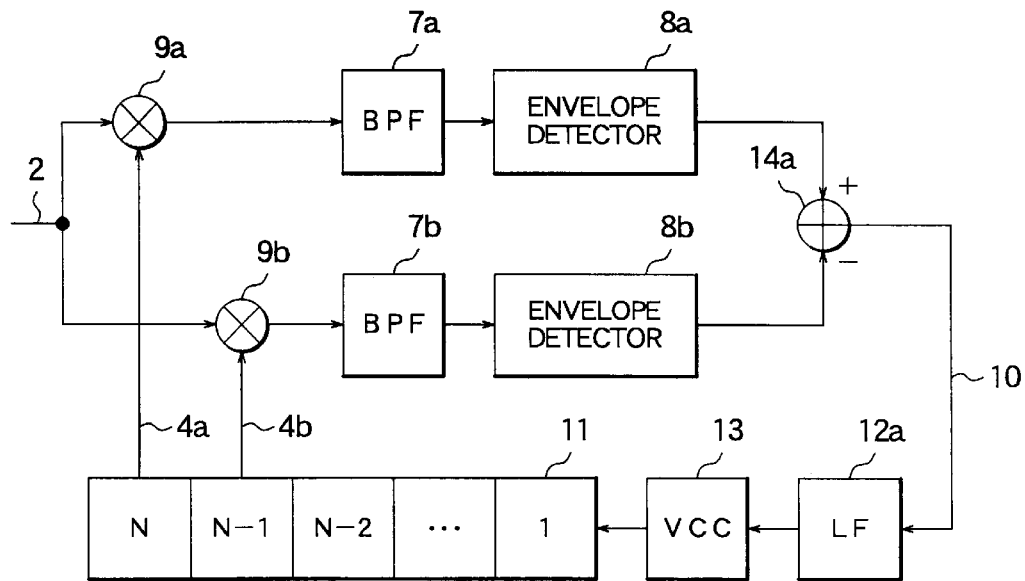
FIG. 1 is a block diagram of a delay locked loop circuit provided in a conventional mobile communication device.

Referring to FIG. 1, a conventional mobile communication device will be described at first in order to facilitate an understanding of this invention. The conventional mobile communication device comprises a delay locked loop circuit illustrated in FIG. 1. The delay locked loop circuit comprises first and second multipliers 9a and 9b, first and second band-pass filters 7a and 7b, first and second envelop detectors 8a and 8b, a subtracter 14a, a loop filter 12a, a voltage-controlled clock generator (VCC) 13 and an N-stage PN code generator 11, where N represents a positive integer which is greater than two. The VCC 13 may comprise a voltage-controlled oscillator and a clock generator.

The illustrated delay locked loop circuit is supplied with a reception signal which is a spread spectrum signal. The reception signal is inputted to the first and the second multipliers 9a and 9b. The first and the second multipliers 9a and 9b are supplied with an N-th stage signal and an (N−1)-th stage signal, respectively. In the example being illustrated, the first and the second multipliers 9a and 9b are connected to the N-stage and the (N−1)-th stage of the N-stage PN code generator 11, respectively. The N-th stage signal and the (N−1)-th stage signal may be called an early signal and a first late signal, respectively. The first multiplier 9a multiplies the reception signal by the early signal to produce a first multiplied signal. More particularly, the first multiplier 9a carries out an inverse spread process to produce the first multiplied signal. Similarly, the second multiplier 9b multiplies the reception signal by the first late signal to produce a second multiplied signal.

The first and the second multiplied signals are supplied to the first and the second envelope detectors 8a and 8b through the first and the second band-pass filters 7a and 7b, respectively, in order to obtain first and second late correlator output signals. The first and the second late correlator output signals are supplied to a subtracter 14a. The subtracter 14 subtracts the second late correlator output signal from the first late correlator output signal to produce a difference signal which is supplied as a tracking error signal to the VCC 13 through the loop filter 12a.

Supplied with the tracking error signal, the VCC 13 produces a clock signal to supply the clock signal to the N-stage PN code generator 11. The N-stage PN code generator 11 has first through N-th stages from which first through N-th PN code signals are outputted. The first through the N-th PN code signals have first through N-th phases different from one another. More particularly, the N-stage PN code generator 11 gives a predetermined delay to a signal supplied to each stage in order to produce the first through the N-th PN code signals having first through N-th phases, respectively.

As described above, the N-th and the (N−1)-th PN code signals may be called the early signal and the first late signal, respectively. The first and the second multipliers 9a and 9b are connected to the N-th and the (N−1)-th stages of the N-stage PN code generator 11, respectively.

The second multiplier 9b may be connected to the (N−2)-th stage of the N-stage PN code generator 11 instead of the (N−1)-th stage. In other words, the second multiplier 9b may be supplied with the (N−2)-th PN code signal in stead of first late signal. The (N−2)-th PN code signal may be called a second late signal.

By the way, the first late signal may be called 1Δ delayed PN code signal which is delayed in one-chip phase from the early signal. The second late signal may be called 2Δ delayed PN code signal which is delayed in two-chip phase from the early signal.

Figure 2:
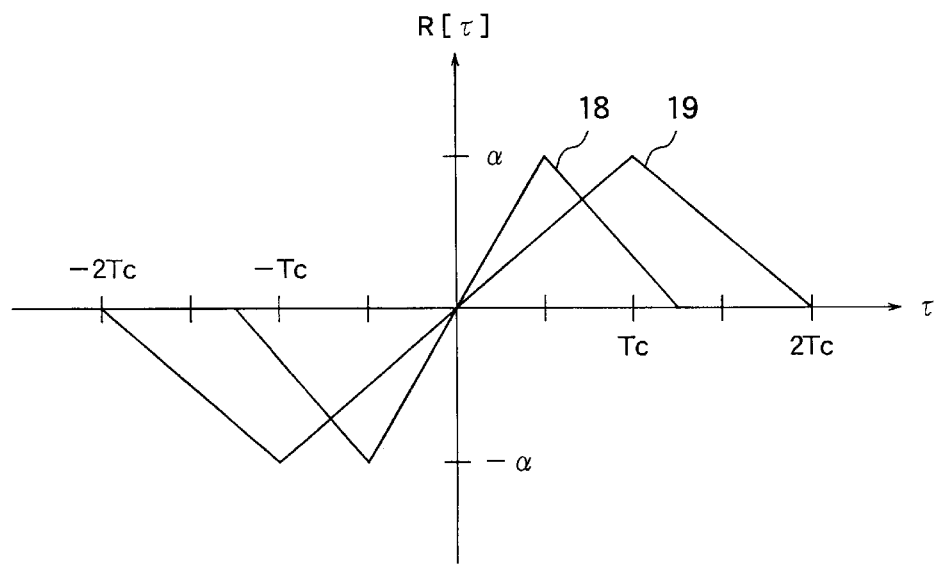
FIG. 2 is a graph showing delay discrimination characteristics of a conventional mobile communication device.

Referring to FIG. 2, it will be assumed that the conventional delay locked loop circuit is referred as a first conventional delay locked loop circuit when the second multiplier 9b is supplied with the first late signal. Furthermore, it will be assumed that the conventional delay locked loop circuit is referred as a second conventional delay locked loop circuit when the second multiplier 9b is supplied with the second late signal.

In FIG. 2, a delay discrimination characteristic 18 corresponds to the first conventional delay locked loop circuit. A delay discrimination characteristic 19 corresponds to the second delay locked loop circuit. Since an inclination is large in the delay discrimination characteristic 18, it is possible to reduce the tracking error decreases. Since the range of an estimated phase difference is wide in the delay discrimination characteristic 19, the pull-out hardly occurs.

In the first conventional delay locked loop circuit, a following range of synchronization is narrow although the tracking error is small. It is difficult to make the following range of synchronization be wide in the first conventional delay locked loop circuit. As a result, a pull-out often occurs in the first conventional delay locked loop circuit.

In the second conventional delay locked loop circuit, the tracking error is large although the following range of synchronization is wide. It is difficult to make the tracking error be small in the second conventional delay locked loop circuit. As a result, it is difficult to correctly carry out a tracking precision.

Figure 3:
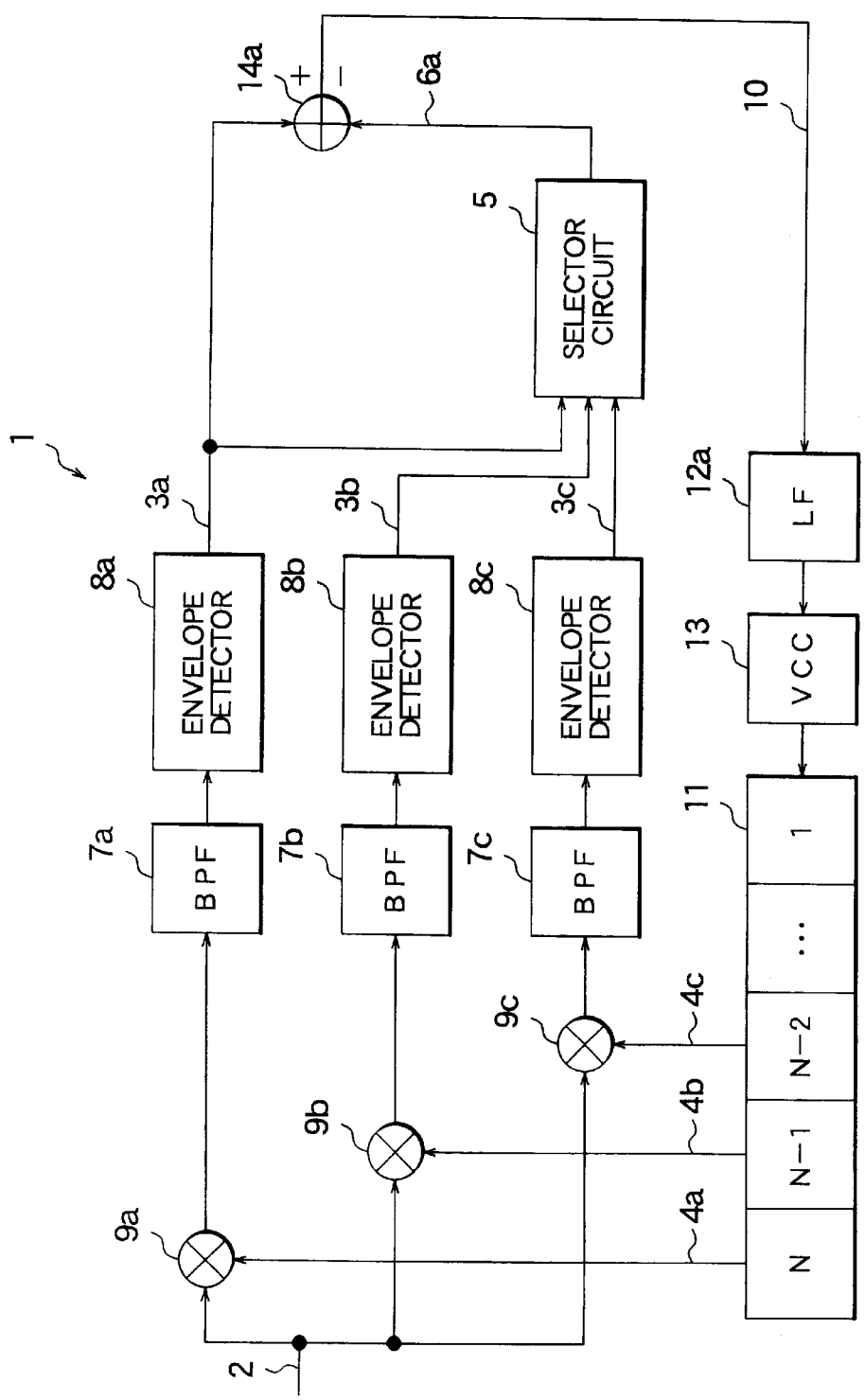
FIG. 3 is a block diagram of a delay locked loop in a mobile communication device according to a preferred embodiment of this invention.

Referring to FIG. 3, description will proceed to a mobile communication device according to a preferred embodiment of this invention. The mobile communication device comprises a delay locked loop circuit illustrated in FIG. 3. The delay locked loop illustrated in FIG. 3 is different in structure from the delay locked loop circuit illustrated in FIG. 1. The delay locked loop circuit comprises similar parts which are designated by like reference numerals and operable with likewise named signals. The delay locked loop circuit further comprises a third multiplier 9c, a third band-pass filter 7c, a third envelop detector 8c, and a selection circuit 5.

Although the first through the third multipliers 9a to 9c are connected to the N-th through the (N−2)-th stages of the N-stage PN code generator 11 in the FIG. 3, the first through the third multipliers 9a to 9c may be connected to k-th to (k−2)-th stages of the N-stage PN code generator 11, where k is a variable between N and 3, both of inclusive.

The third multiplier 9c is supplied with the reception signal and the second late signal to multiply the reception signal by the second late signal, in order to produce a third multiplied signal. The third multiplied signal is supplied to the third envelope detector 8c through the third band-pass filter 7c, in order to obtain a third late correlator output signal. As described in conjunction with FIG. 1, the first and the second envelope detectors 8a and 8b produce the first and the second late correlator output signals. The first through the third late correlator output signals are supplied to the selection circuit 5.

Figure 4:
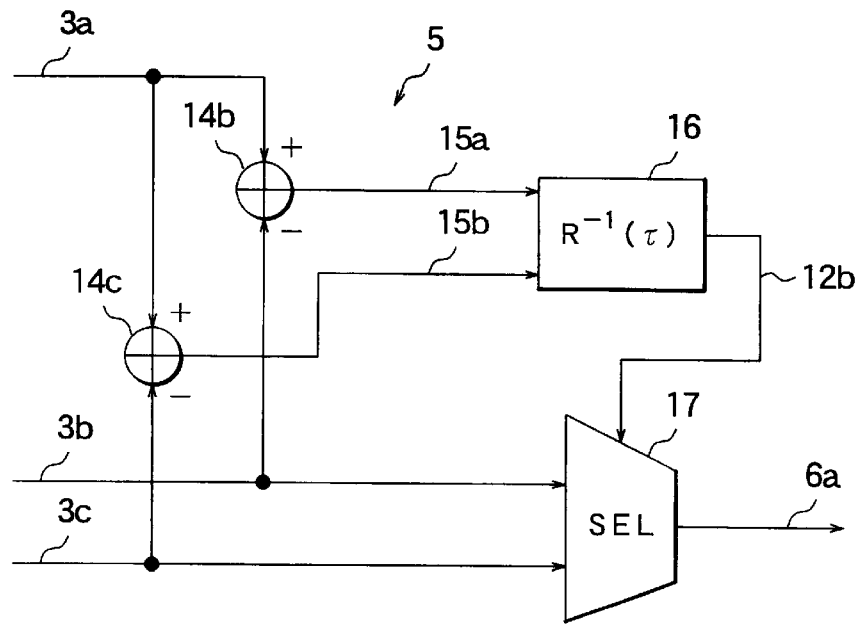
FIG. 4 is a block diagram of a selection circuit illustrated in FIG. 3.

Referring to FIG. 4, the selection circuit 5 comprises first and second subtracters 14b and 14c, a phase estimator 16, and a selector 17. The first late correlator output signal is supplied to the first and second subtracters 14b and 14c. The second late correlator output signal is delivered to the first subtracter 14b and the selector 17. The third late correlator output signal is given to the second subtracter 14c and the selector 17.

The first subtracter 14b calculates a difference between the first late correlator output signal and the second late correlator output signal to produce a first difference signal. Similarly, the second subtracter 14c calculates a difference between the first late correlator output signal and the third late correlator output signal to produce a second difference signal. Each of the first and the second difference signals is supplied to the phase estimator 16. The phase estimator 16 produces a phase estimation result signal on the basis of the first and the second difference signals.

Figure 5:
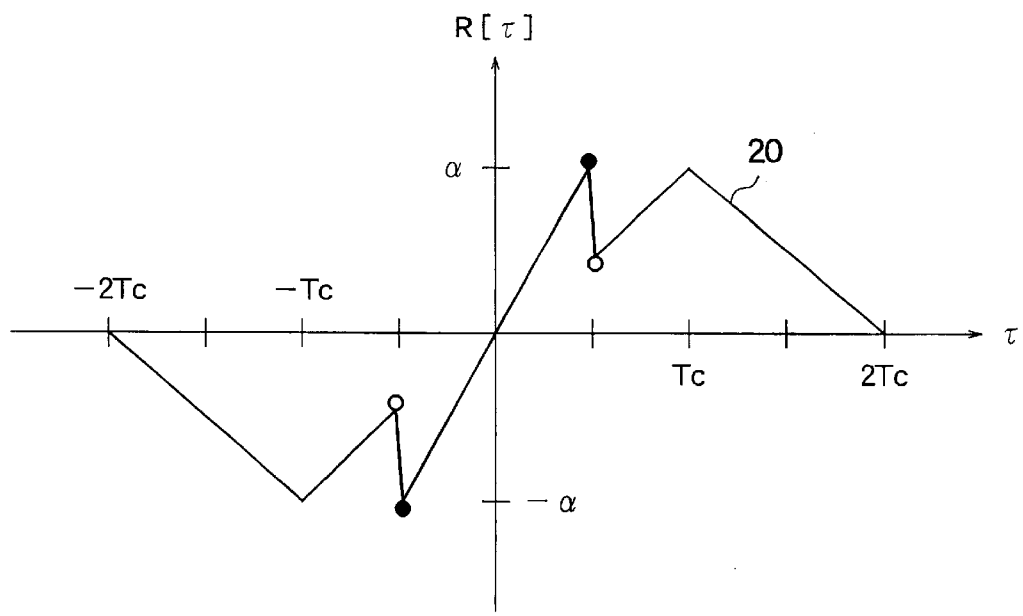
FIG. 5 is a graph showing delay discrimination characteristics of the selection circuit in FIG. 4.

Referring to FIG. 4 in addition to FIG. 5, the phase estimator 16 produces a first phase estimation signal as the phase estimation result signal when ($|\tau| \leq (Tc/2)$), where $\tau$ represents an estimated phase difference and Tc represents a 1-chip time width. When $(Tc/2) < |\tau| < 2Tc$, the phase estimator 16 produces a second phase estimation signal as the phase estimation result signal. Responsive to the first phase estimation signal, the selector selects the second late correlator output signal as a selected late correlator output signal. Responsive to the second phase estimation signal, the selector selects the third late correlator output signal as the selected late correlator output signal. The selected late correlator output signal is supplied to the subtracter 14a, as described in conjunction with FIG. 3. The subtracter 14a produces the tracking error signal in accordance with the first and selected late correlator output signals.

Supplied with the tracking error signal, the VCC 13 produces the clock signal to supply the clock signal to the N-stage PN code generator 11. The N-stage PN code generator 11 supplies the early signal to the first multiplier 9a. Furthermore, the N-stage PN code generator 11 supplies the first and the second late signals to the second and the third multipliers 9b and 9c.

As readily understood from the above description, the phase estimator 16 estimates the tracking phase as an estimated tracking phase in accordance with first and second phase difference signals. The selector 17 selects a selected one of the second and the third late correlator output signals as the selected late correlator output signal on the basis of the estimated tracking phase. As a result, the delay locked loop circuit precisely carries out a synchronization against a noise.

While this invention has thus far been described in conjunction with the preferred embodiment thereof, it will readily be possible for those skilled in the art to put this invention into practice in various other manners.

What is claimed is:

1. A mobile communication device having a delay locked loop circuit for carrying out a tracking synchronization of a reception signal, said reception signal being a spread spectrum signal, wherein said delay locked loop circuit comprises:

generating means for generating an early signal and first and second late signals which are different in phase from one another;

multiplying means for multiplying said reception signal by each of said early signal and said first and said second late signals to produce first through third multiplied signals;

producing means for producing a tracking error signal in accordance with said first through said third multiplied signals; and supplying means for supplying a clock signal to said generating means on the basis of said tracking error signal to make said generating means generate said early signal and said first and said second late signals; wherein said producing means comprises:

first means for filtering said first through said third multiplied signal into first through third filtered signals;

second means for detecting a power in each of said first through said third filtered signals to produce first through third late correlator output signals; and third means for producing said tracking error signal in accordance with said first through said third late correlator output signals; and wherein said third means comprises:

selecting means for selecting one of said second and said third late correlator output signals as a selected late correlator output signal on the basis of said first through said third late correlator output signals; and fourth means for producing said tracking error signal in accordance with said first and said selected late correlator output signals.

2. A mobile communication device as claimed in claim 1, wherein said fourth means is a subtracter for subtracting said selected late correlator output signal from said first late correlator output signal to produce said tracking error signal.

3. A mobile communication device as claimed in claim 1, wherein said selecting means comprises:

fifth means for estimating an estimated tracking error in accordance with said first through said third late correlator output signals; and selector means for selecting one of said second and said third late correlator output signals as the selected late correlator output signal on the basis of said estimated tracking error.

4. A mobile communication device as claimed in claim 3, wherein said fifth means comprises:

first subtracter means for subtracting said second late correlator output signal from said first late correlator output signal to produce a first subtracter signal;

second subtracter means for subtracting said third late correlator output signal from said first late correlator output signal to produce a second subtracter signal; and estimating means for estimating said estimated tracking error in accordance with said first and said second subtracter signals.

* * * * *